US008908158B2

(12) United States Patent
Yoshino et al.

(10) Patent No.: US 8,908,158 B2
(45) Date of Patent: Dec. 9, 2014

(54) ELECTRONIC DISTANCE MEASURING METHOD AND ELECTRONIC DISTANCE MEASURING INSTRUMENT

(75) Inventors: Ken-ichiro Yoshino, Tokyo-to (JP); Kaoru Kumagai, Tokyo-to (JP); Mitsuru Kanokogi, Tokyo-to (JP); Masae Matsumoto, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 393 days.

(21) Appl. No.: 13/527,939

(22) Filed: Jun. 20, 2012

(65) Prior Publication Data

US 2013/0003040 A1  Jan. 3, 2013

(30) Foreign Application Priority Data

Jun. 30, 2011  (JP) ................................. 2011-145605

(51) Int. Cl.
*G01S 7/486* (2006.01)
*G01S 7/497* (2006.01)
*G01S 17/10* (2006.01)

(52) U.S. Cl.
CPC ............... *G01S 7/4865* (2013.01); *G01S 7/497* (2013.01); *G01S 17/10* (2013.01)
USPC ...................................................... 356/5.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS 6,587,187 B2 * 7/2003 Watanabe et al. ............ 356/5.01

FOREIGN PATENT DOCUMENTS

| DE | 3012186 | * 10/1981 | ............. G04F 10/00 |
| JP | 2010-540899 A | 12/2010 | |
| WO | 2009/038737 A2 | 3/2009 | |

* cited by examiner

*Primary Examiner* — Luke Ratcliffe
(74) *Attorney, Agent, or Firm* — Nields, Lemack & Frame, LLC

(57) ABSTRACT

An electronic distance measuring instrument comprises a pulsed light emitting light source, means for creating a distance measuring pulsed light and an internal reference pulsed light, a photodetector for detecting the pulsed lights, and a measuring unit for calculating a distance to an object to be measured based on a photodetection signal. The measuring unit performs coarse distance measurement based on difference of photodetection time between the internal reference pulsed light and the distance measuring pulsed light, carries out Fourier function transform on photodetection waveform of the pulsed lights respectively, separates the waveforms to a plurality of frequency components, obtains phase difference for each of the frequency components acquired, performs fine distance measurement based on time difference acquired from phase difference, and measures a distance to the object by adding a result of coarse distance measurement to a result of fine distance measurement.

14 Claims, 12 Drawing Sheets

ELECTRONIC DISTANCE MEASURING METHOD AND ELECTRONIC DISTANCE MEASURING INSTRUMENT

BACKGROUND OF THE INVENTION

The present invention relates to an electronic distance measuring method and an electronic distance measuring instrument for projecting a pulsed light, for receiving a reflected pulsed light reflected from an object to be measured, and for measuring a distance to the object to be measured according to time difference from the time to project the pulsed light to the time to receive the reflected pulsed light.

In the past, there have been thought up various types of electronic distance measuring instrument using the pulsed light, and a direct sampling system for converting waveform of the pulsed light directly by analog-digital conversion has also been used.

In the conventional type direct sampling systems, there have been such problems that these direct sampling systems are inferior to the systems for distance measurement using filter array because due to restriction of performance characteristics of sampling in A/D conversion, performance characteristics are inferior to performance characteristics of the distance measuring system using filter array. However, there have been problems in that circuit arrangement is more complicated in the system for distance measurement using filter array, and that more components are required, and also, larger circuit board is needed.

SUMMARY OF THE INVENTION

It is an object of the present invention to provide an electronic distance measuring method and an electronic distance measuring instrument, by which it is possible to perform distance measurement with ease and with higher accuracy in the electronic distance measurement using the pulsed light.

To attain the above object, an electronic distance measuring method according to the present invention comprises a step of performing coarse distance measurement based on difference of photodetection time between an internal reference pulsed light and a distance measuring pulsed light reflected from an object to be measured, a step of carrying out Fourier function transform on photodetection waveform of the internal reference pulsed light and photodetection waveform of the distance measuring pulsed light respectively, a step of separating the waveforms to a plurality of frequency components, a step of obtaining phase difference for each of the frequency components acquired, a step of performing fine distance measurement based on difference of time acquired from phase difference, and a step of measuring a distance to the object to be measured by adding a result of coarse distance measurement to a result of fine distance measurement.

Further, an electronic distance measuring instrument according to the present invention comprises a distance measuring optical path, an internal reference optical path, a pulsed light emitting light source for emitting a pulsed light, a pulsed light guiding means for directing the pulsed light emitted from the pulsed light source toward the distance measuring optical path as a distance measuring pulsed light and for directing the pulsed light toward the internal reference optical path as an internal reference pulsed light, a photodetector for emitting photodetection signal by detecting the distance measuring pulsed light and the internal reference pulsed light, and a measuring unit for calculating a distance to an object to be measured based on a photodetection signal from the photodetector, and in the electronic distance measuring instrument, the measuring unit performs coarse distance measurement based on difference of photodetection time between the internal reference pulsed light and the distance measuring pulsed light reflected from the object to be measured, carries out Fourier function transform on photodetection waveform of the internal reference pulsed light outputted by the photodetector and photodetection waveform of the distance measuring pulsed light respectively, separates the waveforms to a plurality of frequency components, obtains phase difference for each of the frequency components acquired, performs fine distance measurement based on time difference acquired from phase difference, and measures a distance to the object to be measured by adding a result of coarse distance measurement to a result of fine distance measurement.

Further, in the electronic distance measuring instrument according to the present invention, the measuring unit comprises an A/D converter for converting a photodetection signal acquired from the photodetector by analog-digital conversion, a data capture unit for receiving digital signal from the A/D converter, a buffer unit for successively storing data from the data capture unit, a digital comparator for detecting that the data from the data capture unit has crossed over a preset threshold value, a storage unit for storing data of the buffer unit based on a signal from the digital comparator, a Fourier function transform unit for processing the data of the storage unit by Fourier transform, a rough clock counter for counting sampling clocks of the A/D converter, a clock synchronized to the sampling clock, a rough clock storage unit for storing count value of the rough clock counter based on a signal from the digital comparator, a clock oscillator for supplying synchronized clock to each of the A/D converter, the data capture unit, the buffer unit, the digital comparator, and the rough clock counter, and an arithmetic control unit for calculating distance based on all data from the rough clock storage unit and from the Fourier function transform unit.

Further, in the electronic distance measuring instrument according to the present invention, amplitude and phase of each of frequency components separated are obtained according to all data from the Fourier transform function unit, and weighted averaging is performed based on the amplitude and the distance is calculated.

Further, in the electronic distance measuring instrument according to the present invention, there is provided a temperature sensor for detecting temperature of the A/D converter, and calibration of the A/D converter is performed according to detection signal from the temperature sensor.

Further, in the electronic distance measuring instrument according to the present invention, the arithmetic control unit has calibration data corresponding to temperature of the A/D converter, selects the calibration data based on temperature detecting signal from the temperature sensor, and performs calibration on the A/D converter.

Further, in the electronic distance measuring instrument according to the present invention, there is provided a transimpedance amplifier for converting an electric signal from the photodetector to a voltage signal, and output of the transimpedance amplifier is a logarithmical output.

Further, in the electronic distance measuring instrument according to the present invention, the pulsed light emitting light source is a synchronized pulsed light emitting light source for emitting a pulsed distance measuring light according to light emitting signal synchronized with a signal from the clock oscillator.

Further, in the electronic distance measuring instrument according to the present invention, the pulsed light emitting light source is a non-synchronized pulsed light emitting light source for emitting a distance measuring pulsed light non-synchronized with a signal from the clock oscillator.

Further, in the electronic distance measuring instrument according to the present invention, there are provided the internal reference optical path for guiding the pulsed light from the pulsed light emitting light source toward the photodetector, an optical path coupling unit for coupling the internal reference optical path with optical path of a photodetection optical system, the distance measuring optical path for projecting the pulsed light to the object to be measured, and an optical path changeover unit for changing over the internal reference optical path, and a distance is calculated from a pulsed light emitting signal, from the pulses detected by the distance measuring optical path, and from data acquired from the pulses as detected by the internal reference optical path.

Further, in the electronic distance measuring instrument according to the present invention, the pulsed light guiding means is an optical path splitting unit for splitting the pulsed light from the pulsed light emitting light source, and there are provided a distance measuring optical path extension for forming an optical path difference between the light reflected from the object to be measured and the internal reference optical path, and an optical path coupling unit for coupling the internal reference optical path with an optical path from the distance measuring optical path extension, and a distance is calculated from the pulsed light emission signal, from the reflected pulsed light detected by the distance measuring optical path and from the data acquired from the internal reference pulsed light as detected by the internal reference optical path.

Further, in the electronic distance measuring instrument according to the present invention, the pulsed light guiding means is an optical path splitting unit for splitting the pulsed light from the pulsed light emitting light source and for guiding the pulsed light toward the internal reference optical path, and there are provided a distance measuring optical path extension for forming an optical path difference between the reflected pulsed light reflected from the object to be measured and the internal reference optical path, and an optical path coupling unit for coupling the internal reference optical path with an optical path from the distance measuring optical path extension, and a distance is calculated from the internal reference pulsed light detected by the internal reference optical path and from the data acquired from reflected pulsed light detected by the distance measuring optical path.

Further, in the electronic distance measuring instrument according to the present invention, the pulsed light guiding means is an optical path splitting unit for splitting the pulsed light from the pulsed light emitting light source, the optical path splitting unit guides the split pulsed light toward the internal reference optical path and there are provided a distance measuring optical path extension, which is disposed along the distance measuring optical path, for forming an optical path difference from the internal reference optical path, an optical path coupling unit for coupling the internal reference optical path with an optical path from the distance measuring optical path extension, a second internal reference optical path for guiding the pulsed light from the pulsed light emitting light source to the distance measuring optical path extension, a second optical path coupling unit for coupling the light reflected from the object to be measured with the second internal reference optical path, a second optical path changeover unit for changing over the distance measuring optical path for projecting the pulsed light toward the object to be measured and the second internal reference optical path, and a distance is calculated from the pulsed light emitting signal, from the pulses detected by the distance measuring optical path, from the pulses detected by the internal reference optical path, and from the data acquired from the second internal reference optical path.

Furthermore, in the electronic distance measuring instrument according to the present invention, the pulsed light guiding means is an optical path splitting unit for splitting the pulsed light from the pulsed light emitting light source, the optical path splitting unit guides the split pulsed light toward the internal reference optical path and there are provided a distance measuring optical path extension, which is provided along the distance measuring optical path, for forming optical path difference from the internal reference optical path, an optical path coupling unit for coupling the internal reference optical path with an optical path from the distance measuring optical path extension, a second internal reference optical path for guiding the pulsed light from the pulsed light emitting light source toward the distance measuring optical path extension, a second optical path coupling unit for coupling the second internal reference optical path with a light reflected from the object to be measured, and a second optical path changeover unit for changing over the second internal reference optical path, and a distance is calculated from the pulses detected from the distance measuring optical path, from the pulses detected by the internal reference optical path, and from data acquired by the second internal reference optical path.

According to the present invention, an electronic distance measuring method comprises a step of performing coarse distance measurement based on difference of photodetection time between an internal reference pulsed light and a distance measuring pulsed light reflected from an object to be measured, a step of carrying out Fourier function transform on photodetection waveform of the internal reference pulsed light and photodetection waveform of the distance measuring pulsed light respectively, a step of separating the waveforms to a plurality of frequency components, a step of obtaining phase difference for each of the frequency components acquired, a step of performing fine distance measurement based on difference of time acquired from phase difference, and a step of measuring a distance to the object to be measured by adding a result of coarse distance measurement to a result of fine distance measurement. As a result, it is possible to perform approximate distance measurement easily by coarse measurement and to overcome the insufficiency of accuracy of the coarse measurement by precise (fine) measurement and to accomplish distance measurement with higher accuracy in easy and simple manner.

Further, according to the present invention, an electronic distance measuring instrument comprises a distance measuring optical path, an internal reference optical path, a pulsed light emitting light source for emitting a pulsed light, a pulsed light guiding means for directing the pulsed light emitted from the pulsed light source toward the distance measuring optical path as a distance measuring pulsed light and for directing the pulsed light toward the internal reference optical path as an internal reference pulsed light, a photodetector for emitting photodetection signal by detecting the distance measuring pulsed light and the internal reference pulsed light, and a measuring unit for calculating a distance to an object to be measured based on a photodetection signal from the photodetector, and in the electronic distance measuring instrument, the measuring unit performs coarse distance measurement based on difference of photodetection time between the internal reference pulsed light and the distance measuring pulsed light reflected from the object to be measured, carries out Fourier function transform on photodetection waveform of the internal reference pulsed light outputted by the photodetector and photodetection waveform of the distance measuring pulsed light respectively, separates the waveforms to a plurality of frequency components, obtains phase difference for each of the frequency components acquired, performs fine distance measurement based on time difference acquired from phase difference, and measures a distance to the object to be measured by adding a result of coarse distance measurement to a result of fine distance measurement. As a result, it is possible to perform approximate distance measurement easily by coarse measurement and to overcome the insufficiency of accuracy of the coarse measurement by precise (fine) measurement and to accomplish distance measurement with higher accuracy in easy and simple manner.

Further, according to the present invention, in the electronic distance measuring instrument, the measuring unit comprises an A/D converter for converting a photodetection signal acquired from the photodetector by analog-digital conversion, a data capture unit for receiving digital signal from the A/D converter, a buffer unit for successively storing data from the data capture unit, a digital comparator for detecting that the data from the data capture unit has crossed over a preset threshold value, a storage unit for storing data of the buffer unit based on a signal from the digital comparator, a Fourier function transform unit for processing the data of the storage unit by Fourier transform, a rough clock counter for counting sampling clocks of the A/D converter, a clock synchronized to the sampling clock, a rough clock storage unit for storing count value of the rough clock counter based on a signal from the digital comparator, a clock oscillator for supplying synchronized clock to each of the A/D converter, the data capture unit, the buffer unit, the digital comparator, and the rough clock counter, and an arithmetic control unit for calculating distance based on all data from the rough clock storage unit and from the Fourier function transform unit. As a result, by using direct sampling system, it is possible to provide an electronic distance measuring instrument, which has a few components and smaller printed circuit board and has high performance characteristics.

Further, according to the present invention, in the electronic distance measuring instrument, amplitude and phase of each of frequency components separated are obtained according to all data from the Fourier transform function unit, and weighted averaging is performed based on the amplitude and the distance is calculated. As a result, a plurality of measurement values can be obtained from a single photodetection signal, and the measurement with higher accuracy can be attained.

Furthermore, according to the present invention, in the electronic distance measuring instrument, there is provided a temperature sensor for detecting temperature of the A/D converter, and calibration of the A/D converter is performed according to detection signal from the temperature sensor, and the arithmetic control unit has calibration data corresponding to temperature of the A/D converter, selects the calibration data based on temperature detecting signal from the temperature sensor, and performs calibration on the A/D converter. As a result, errors occurring in the conversion process at the A/D converter can be corrected at all times, measurement results with higher reliability can be obtained.

DETAILED DESCRIPTION OF THE PREFERRED EMBODIMENTS

By referring to the attached drawings, description will be given below on embodiments of the present invention.

First, referring to FIG. 1, description will be given on an example of an electronic distance measuring instrument, to which the present invention is applied.

Figure 1:
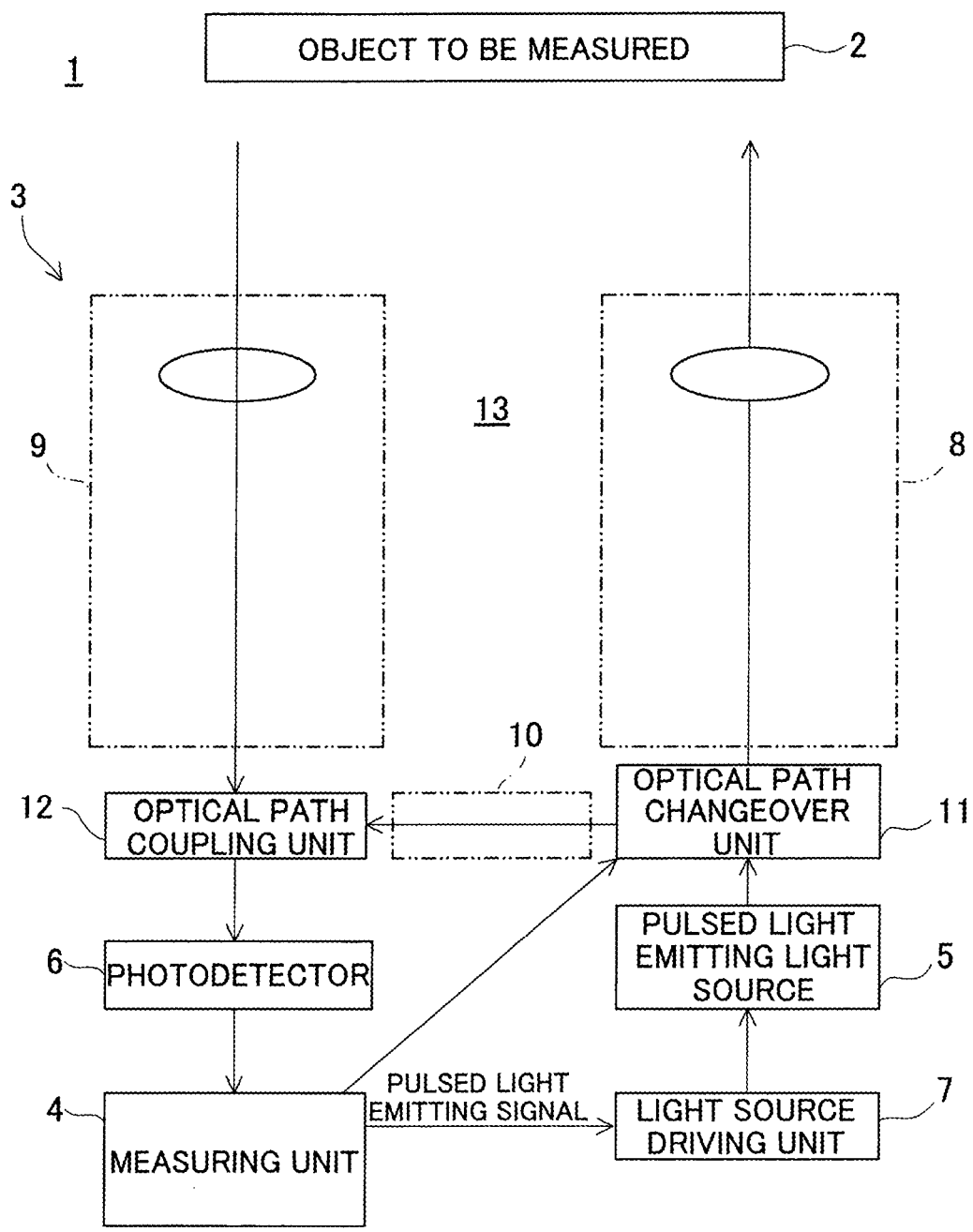
FIG. 1 is a schematical block diagram of an electronic distance measuring instrment according to a first embodiment of the present invention.

In FIG. 1, reference numeral 1 represents an electronic distance measuring instrument, and numeral 2 represents an object to be measured.

The electronic distance measuring instrument 1 primarily comprises a housing (not shown), and an optical unit 3 accommodated in the housing, and a measuring unit 4.

First, description will be given on the optical unit 3.

The optical unit 3 comprises a pulsed light emitting light source 5 for emitting a pulsed light of a laser beam, a photodetector 6 for detecting a reflected light from the object to be measured 2 and for emitting electric signals, a light source driving unit 7 for driving the pulsed light emitting light source 5 to emit the pulsed light, a projection optical system 8 for projecting the pulsed light from the pulsed light emitting light source 5 toward the object to be measured 2, a photodetection optical system 9 for detecting a reflected pulsed light from the object to be measured 2 and for guiding the reflected pulsed light to the photodetector 6, and an internal reference optical path 10 for guiding the pulsed light from the pulsed light emitting light source 5 to the photodetector 6. The projection optical system 8, the photodetection optical system 9, etc. make up together a distance measuring optical path 13.

An optical path changeover unit 11 is provided at a branch point where the internal reference optical path 10 is branched off from the projection optical system 8, and an optical path coupling unit 12 is provided at a joining point of the photodetection optical system 9 and the internal reference optical path 10.

The optical path changeover unit 11 selectively chooses as to whether the pulsed light emitted from the pulsed light emitting light source 5 are emitted to the projection optical system 8 or to the internal reference optical path 10. The pulsed light emitted to the projection optical system 8 is projected toward the object to be measured 2 as a distance measuring light, and the pulsed light emitted to the internal reference optical path 10 is regarded as internal reference pulsed light.

The optical path coupling unit 12 is an optical part such as a half-mirror or the like, for instance. The optical path coupling unit 12 allows the reflected pulsed light from the photodetection optical system 9 to transmit and guides toward the photodetector 6. By the optical path coupling unit 12, the internal reference pulsed light from the internal reference optical path 10 is reflected and guided toward the photodetector 6. The photodetector 6 outputs a photodetection signal to the measuring unit 4.

The measuring unit 4 emits a pulsed light emitting signal to the light source driving unit 7, controls driving of the light source driving unit 7, and further, issues a changeover signal to the optical path changeover unit 11 and controls optical path changeover of the optical path changeover unit 11 in synchronization with light emission timing of the light source driving unit 7. The photodetection signal from the photodetector 6 is inputted to the measuring unit 4, and a distance to the object to be measured 2 is calculated based on the photodetection signal of the reflected pulsed light from the object to be measured 2 inputted from the photodetector 6 and based on a photodetection signal of the internal reference pulsed light.

The optical path changeover unit 11 fulfills the functions as a pulsed light guiding means for directing the pulsed light emitted from the pulsed light emitting light source 5 as a distance measuring pulsed light toward the distance measuring optical path 13 and for directing the pulsed light as internal reference light pulsed light toward the internal reference optical path 10.

Now, description will be given on general outline of the distance measurement by the electronic distance measuring instrument 1.

The optical path changeover unit 11 allows the pulsed light to pass as a distance measuring light. The pulsed light is projected to the object to be measured 2 and are reflected by the object to be measured 2. Then, the pulsed light enters the photodetection optical system 9 as reflected pulsed light. Further, the reflected pulsed light is received by the photodetector 6 via the optical path coupling unit 12, and a photodetection signal is outputted to the measuring unit 4.

The optical path changeover unit 11 changes over the optical path, and the pulsed light is received by the photodetector 6 via the internal reference optical path 10 and the optical path coupling unit 12 as internal reference light pulsed light. The photodetector 6 outputs a photodetection signal of the internal reference pulsed light to the measuring unit 4.

The measuring unit 4 judges that the pulsed light is detected at a moment when the photodetection signal crosses over a threshold value as set in advance. Then, photodetection time is determined for each of the reflected pulsed light and the internal reference pulsed light and each photodetection time of the reflected pulsed light and the internal reference pulsed light is compared, and time difference is calculated. Because this time difference represents a time period for the pulsed light to go to and from the object to be measured 2, a distance to the object to be measured 2 is calculated based on light velocity and the time difference.

Drift of detection circuit or the like of the measuring unit 4 causes influence as measurement error. However, by obtaining a difference between the internal reference pulsed light and the reflected pulsed light, the influence from the drift of the detection circuit or the like are set off, and accurate distance can be calculated.

The processing of distance measurement as described above is a general method to perform distance measurement by using the pulsed light, and light amount of the reflected pulsed light is changed, depending on condition of reflection surface of the object to be measured 2 or on the distance to be measured.

Figure 2:
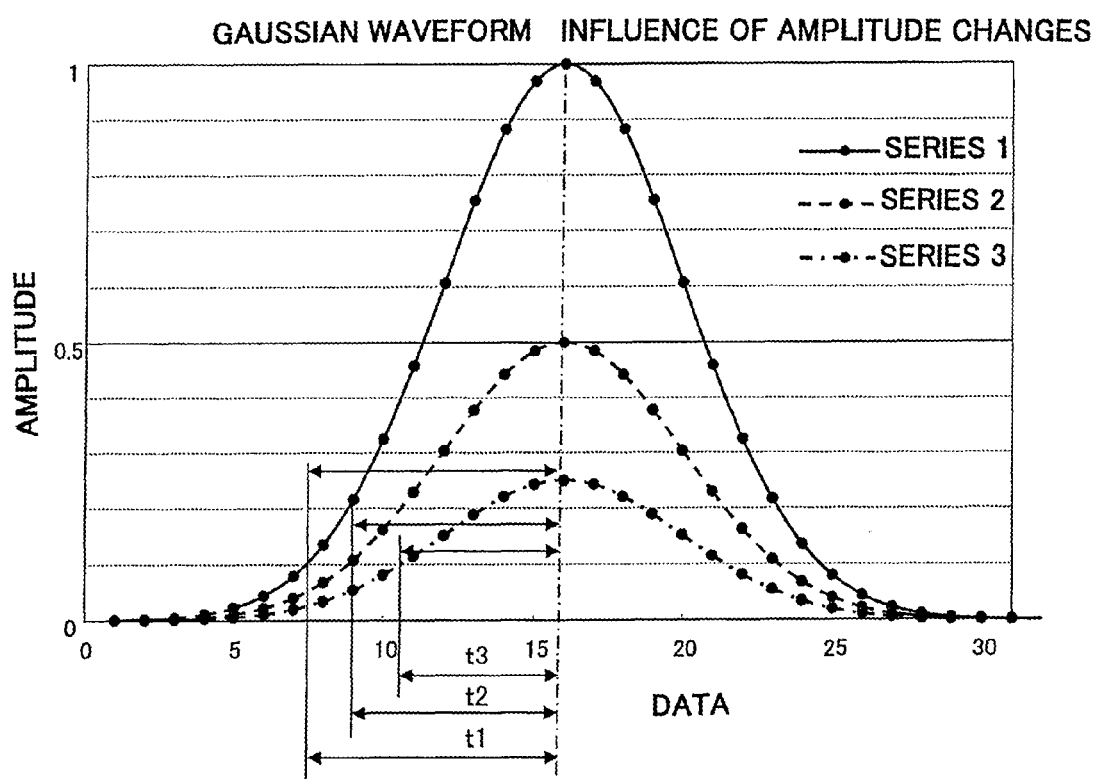
FIG. 2 is a graph to show an example of signal waveform when a photodetector in the electronic distance measuring instrument according to the first embodiment detects the pulsed light.

FIG. 2 is a graphic representation of a photodetection signal of the photodetector 6, corresponding to the light amount of the reflected pulsed light. Waveform of the photodetection signal is represented as Gaussian waveform, and series 1, series 2, and series 3 each represents a case of amplitude 1, amplitude 0.5 and amplitude 0.25 respectively. When the light amount of the reflected pulsed light is high, the waveform has bigger amplitude, and the waveform is represented by a curve with the maximum value at a higher position (series 1). When the light amount of the reflected pulsed light is lower, the waveform has smaller amplitude (with lower maximum value), and the waveform is represented by a gently-sloping curve (series 3).

Even in a case where it is assumed that position (time) of the maximal position (the maximal value) of the amplitude is the same regardless of whether the light amount of the reflected pulsed light is higher or lower, if the moment when the pulsed light is detected is judged by the threshold value as given above, the time of the photodetection changes, depending on the value of the light amount of the reflected pulsed light.

As shown in FIG. 2, when it is supposed that the threshold value is set to 0.1 with respect to the maximal value of the photodetection signal, the time when the photodetection signal crosses over the threshold value is changed, depending on the light amount. In case of a curve (series 1) where the maximal value of the amplitude is high, the time is away (separated) from the maximal value, and the time comes closer to the maximal value in case of a curve (series 3), in which the maximal value of amplitude is smaller.

Therefore, in a case where the light amount of the reflected pulsed light is higher, it is judged that the pulsed light is detected at a moment earlier by t1 than the maximal value. In a case where the light amount of the reflected pulsed light is lower, it is judged that the pulsed light is detected earlier by t3 than the maximal value. As a result, depending on the value of the light amount of the reflected pulsed light, an error (Δt=t1− t3) occurs.

Further, depending on conditions of reflection surface of the object to be measured 2, the waveform of the photodetection signal of the reflected pulsed light may be changed. In such case, the moment of the detection of the pulsed light may vary.

In the present embodiment, by signal processing of the measuring unit 4, it is set in such manner that distance measurement can be executed with high accuracy regardless of the value of the light amount of the reflected pulsed light or regardless of the change of waveform of the photodetection signal.

Description will be given below on the measuring unit 4.

Figure 3:
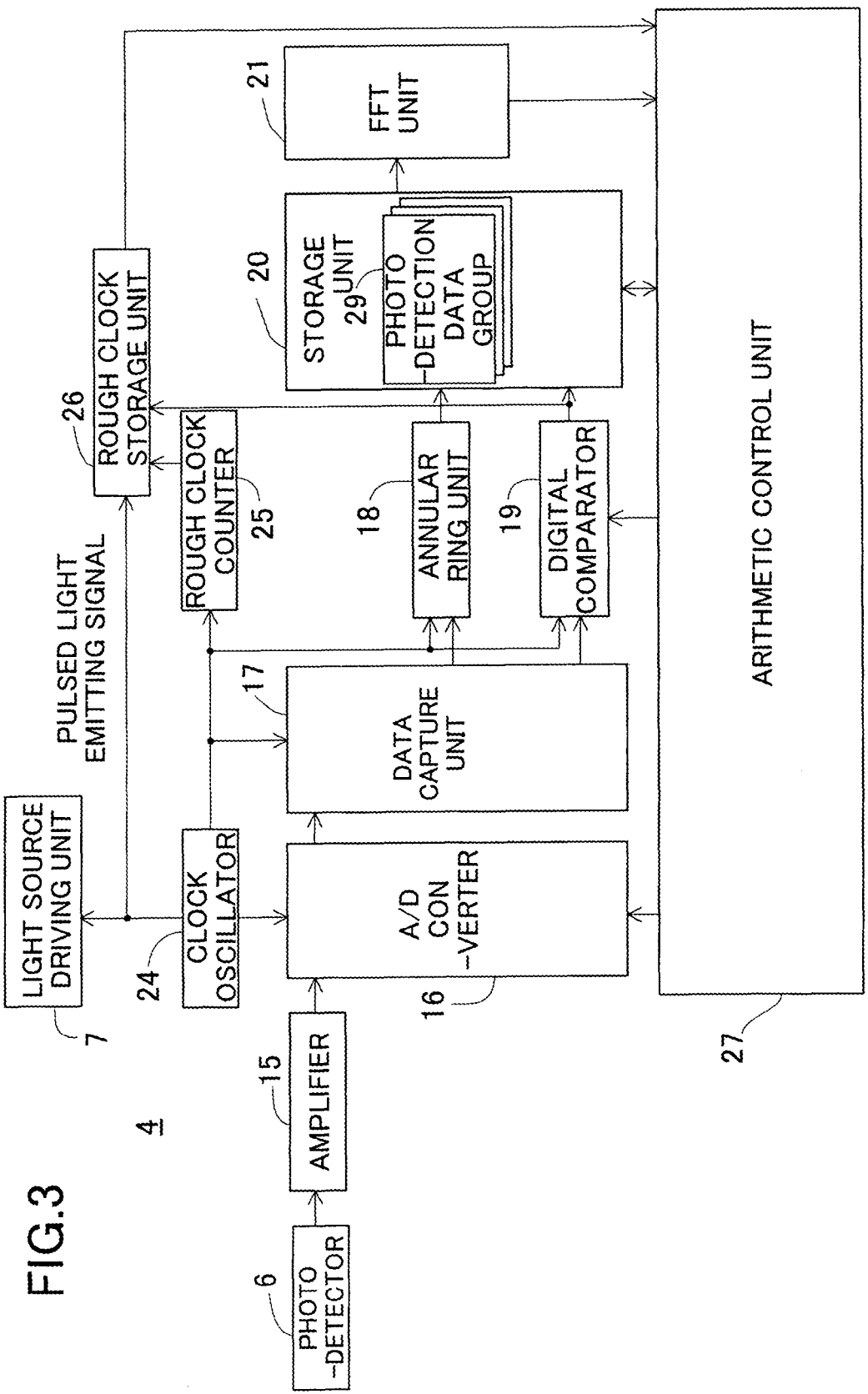
FIG. 3 is a schematical block diagram of a measuring unit in the first embodiment.
Figure 4:
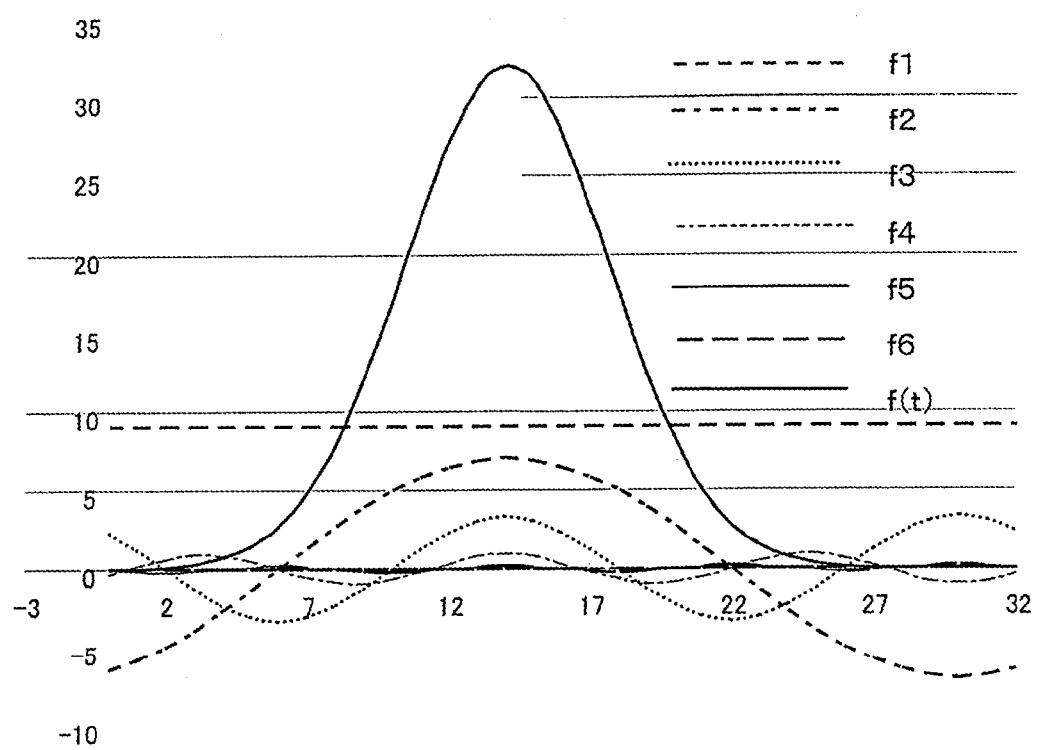
FIG. 4 is a graphic representation where frequency components obtained by Fourier function transform of waveforms detected by the photodetector at the measuring unit are taken apart and are displayed over a time range.

FIG. 3 is a block diagram to show the measuring unit 4 in the first embodiment of the present invention. In FIG. 4, the measuring unit 4 comprises a trans-impedance amplifier used as an amplifier 15, an A/D converter 16, a data capture unit 17, a ring buffer unit 18, a digital comparator 19, a storage unit 20, a Fourier function transform unit (hereinafter referred as "FFT unit") 21, a clock oscillator 24, a rough clock counter 25, a rough clock storage unit 26, an arithmetic control unit 27 for calculating a distance to the object to be measured, or the like.

A photodetection signal from the photodetector 6 is inputted to the amplifier 15, and a clock signal from the clock oscillator 24 is inputted to the light source driving unit 7 as a synchronization signal and a light emission instruction signal.

Each time an optical pulse is emitted, the measuring unit 4 carries out signal processing as described below on the photodetection signal of the reflected pulsed light and the internal reference pulsed light as obtained. Because the processing of the reflected pulsed light is the same as the processing of the internal reference pulsed light, description will be given below only on the reflected pulsed light.

The reflected pulsed lights are converged by the photodetection optical system 9, and the reflected pulsed lights enter the photodetector 6 via the optical path coupling unit 12. After being detected by the photodetector 6, the reflected pulsed light is converted to a pulsed light electric current in photoelectric conversion by the photodetector 6. The pulsed light electric current is inputted to the amplifier 15, and the pulsed light electric current is converted to a pulsed voltage signal at the amplifier 15.

After being outputted from the amplifier 15, an analog pulsed voltage signal is inputted to the A/D converter 16. Based on a clock signal supplied from the clock oscillator 24, the A/D converter 16 carries out sampling at a predetermined time interval from the analog signals and converts the signals thus sampled to digital signals. Output from the amplifier 15 is a logarithmical output.

The data capture unit 17 captures the digital signal as converted by the A/D converter 16, and the digital signal is sent to the ring buffer unit 18 and the digital comparator 19. The ring buffer unit 18 stores an amount of digital signals as necessary from the A/D converter 16 and maintains the digital signal for a while. In case the digital signals are captured beyond the amount as required, the most up-to-date digital data are overwritten on the digital data, which is older in terms of time, and the data are successively updated and stored.

Therefore, digital data are stored in the ring buffer unit 18, i.e. from the newest digital data to the preceding digital data as required from the newest digital data.

A threshold value is set up by the arithmetic control unit 27 on the digital comparator 19. The digital comparator 19 detects whether the digital data from the A/D converter 16 has crossed over the threshold value (has exceeded the threshold value) or not. If it is detected that the digital data has crossed over the threshold value, a crossing signal is outputted to the storage unit 20 and to the rough clock storage unit 26.

Based on the crossing signal from the digital comparator 19, the storage unit 20 extracts digital data within a predetermined range, using the crossing signal as a reference, from the digital data as stored in the ring buffer unit 18 and stores the data as a photodetection data group 29 on each of the reflected pulsed lights. As a result, at least one reflection pulse is obtained from each optical pulse. Further, at least one photodetection data group 29 as acquired for each of the reflected pulsed lights is stored in the storage unit 20.

The photodetection data group 29 is sent to the FFT unit 21. Then, Fourier function transform (FFT) is carried out on the photodetection data group 29 at the FFT unit 21, and the photodetection waveform is separated to a plurality of frequency components. For instance, in case the photodetection waveform is in Gaussian waveform as shown in FIG. 2, the waveforms of a plurality of frequency components as obtained by Fourier function transform are as shown in FIG. 4. In FIG. 4, a curve f(t) represents photodetection waveform outputted by the photodetector 6, and f1 to f6 represent one to six order frequency components as separated.

The FFT unit 21 calculates real number part and imaginary number part of each of the frequency components, and the results are outputted to the arithmetic control unit 27.

The clock oscillator unit 24 supplies a synchronized clock to the A/D converter 16 to each of the data capture unit 17, the ring buffer unit 18, the digital comparator 19, and the rough clock counter 25 respectively.

The rough clock counter 25 counts the time according to a clock, which is the same as the clock supplied to the A/D converter 16 or to a clock synchronized with the clock supplied to the A/D converter with lower frequency. Based on the time when the pulsed light emitting signal is issued and also on the crossing signal issued from the digital comparator 19, number of counts of the clock, i.e. time up to the time when the reflected pulsed light is detected from the time when the pulsed light emitting signal is issued is stored in the rough clock storage unit 26. The number of counts thus obtained is outputted to the arithmetic control unit 27. The counting of the clock in a case where the pulsed light is detected by the rough clock counter 25 is performed in the same manner as in case of the internal reference pulsed light.

The arithmetic control unit 27 obtains difference of photodetection time between the reflected pulsed light and the internal reference light based on the number of counts of the clock as inputted from the rough clock storage unit 26, and rough measurement is performed to calculate the distance from the photodetection time difference and the light velocity.

On the reflected pulsed light and on the internal reference pulsed light, the arithmetic control unit 27 calculates amplitude and phase of each of the frequency components from the data of real number part and imaginary number part of each of the frequency components as inputted from the FFT unit 21. Time information of higher frequency can be obtained than time information based on the clock signal. Based on the time information thus obtained, precise time difference between the reflected pulsed light and the internal reference pulsed light is acquired based on the time information thus obtained. Then, precise measurement is performed according to the precise time difference.

By adding the result of the precise measurement on the result of rough measurement, a distance to the object to be measured 2 can be determined with high accuracy.

Figure 5:
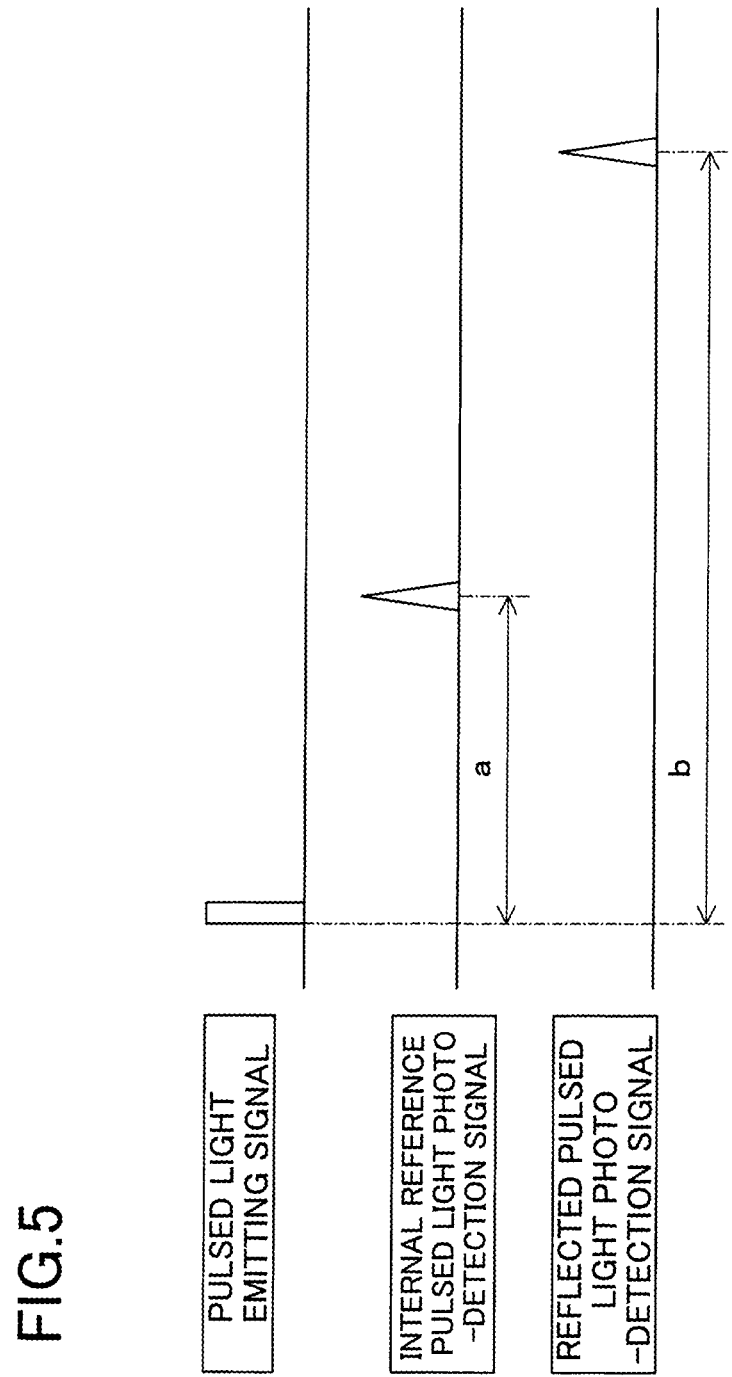
FIG. 5 is a diagram to show a relation between photodetection signal and a pulsed light emitting signal when the photodetector detects an internal reference pulsed light and reflected pulsed light.

FIG. 5 represents photodetection signals when the photodetector 6 detects the internal reference pulsed light and the reflected pulsed light. At the rough clock storage unit 26, a clock number "a" (when the internal reference pulsed light is detected from the pulsed light emitting signal) and a clock number "b" (when the reflected pulsed light is received from the pulsed light emitting signal) are counted, and the results are outputted to the arithmetic control unit 27.

The arithmetic control unit 27 executes rough measurement based on a light velocity C and the time required to and from the object to be measured 2—that is, (b−a).

Next, description will be given on precise measurement to be executed based on the data of real number part and imaginary number part of each of the frequency components to be inputted from the FFT unit 21.

If it is supposed here that the real number part and the imaginary number part calculated at the FFT unit 21 are "R+iI", amplitude as well as phase are calculated by the following equations respectively:

$$\text{Amplitude: Mag} = \sqrt{(R^2 + I^2)}$$

$$\text{Phase: } \phi = \tan^{-1}(I/R)$$

Figure 6:
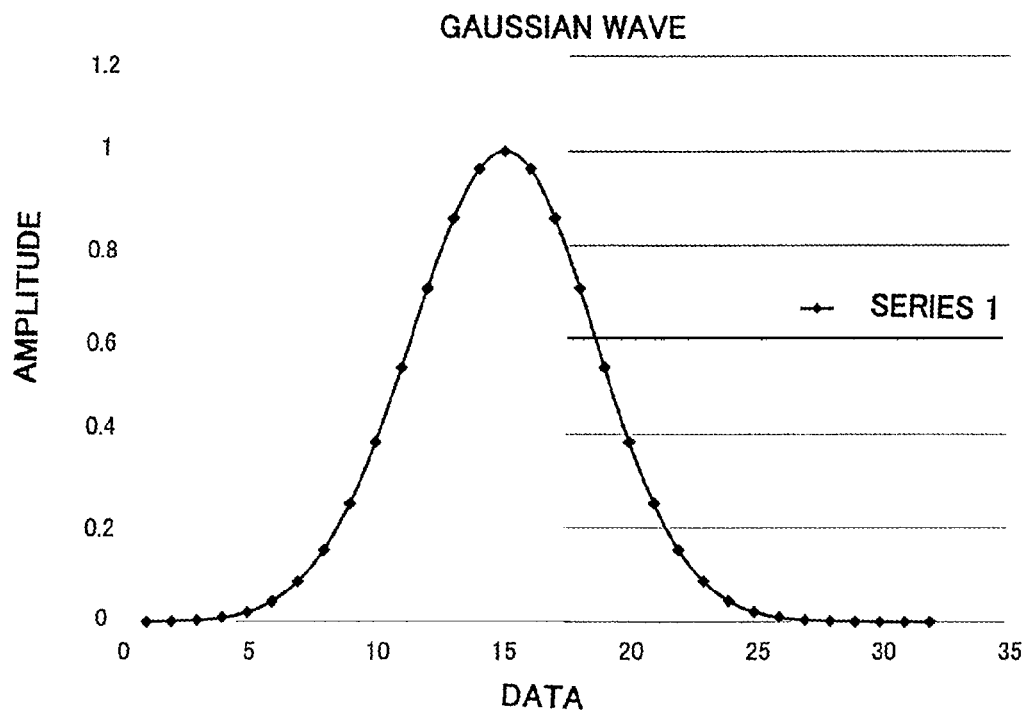
FIG. 6 is a graphic representation to show a relation between Gaussian waves and sampling by A/D conversion, assuming that the waveforms received by the photodetector are Gaussian waves.
Figure 7:
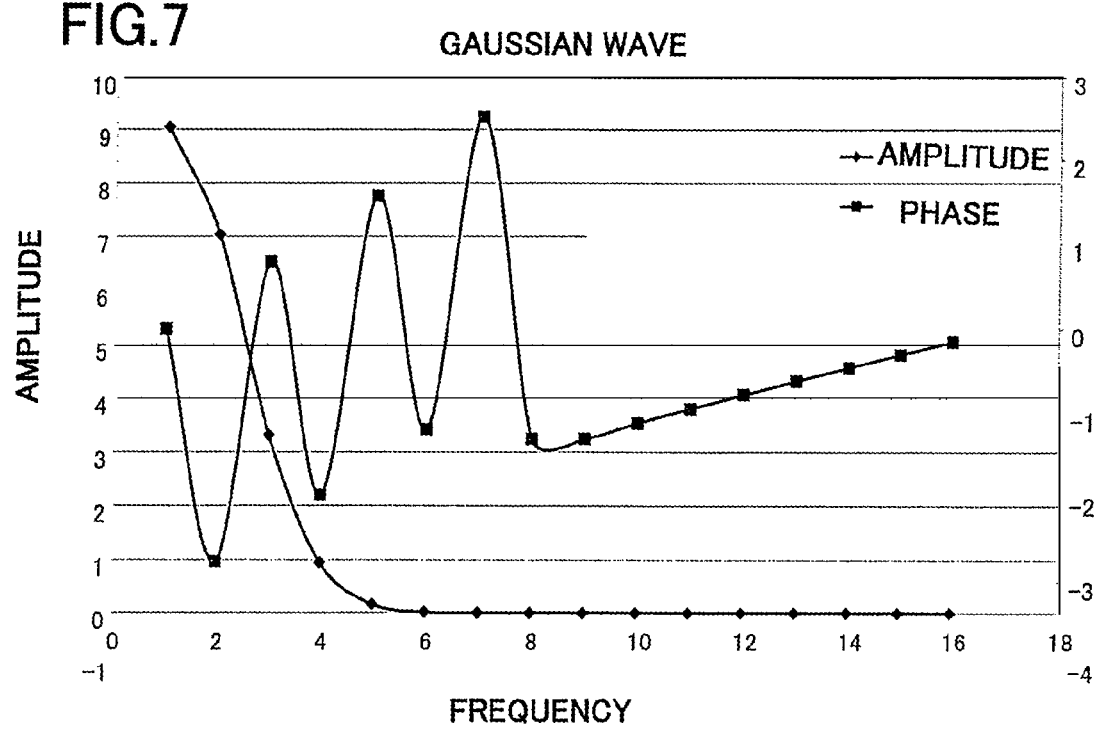
FIG. 7 is a graphic representation of the results obtained by calculation of amplitude and phase when the Gaussian waves shown in FIG. 6 are processed by Fourier transform.

In FIG. 6, the photodetection signal is shown as Gaussian wave and is expressed by 32 data. When Fourier transform is carried out by using these 32 data, the Gaussian wave can be separated to 16 waveforms of frequencies (i.e. from f1 to f16) as shown in FIG. 7. Further, amplitude and phase with respect to each of the frequency components can be obtained. FIG. 7 shows the result of Fourier function transform of Gaussian waveform shown in FIG. 6.

The frequency "fn" given in the results of the Fourier function transform (FFT) is given as:

$$fn = f\text{sample} \times (n-1)/32$$

where f sample: conversion frequency [Hz] of the A/D converter.

To convert their frequency components to the distance, f1 is not used because f1 is a DC component. By using phase and amplitude of each of the frequency components from f2 to f16, the distance is calculated.

For each of the frequency components, phase difference between a phase component φEn (of the distance measurement signal pulse waveform along the distance measurement optical path 13) and a phase component φIn (of pulse waveform of reference signal along the internal reference optical path 10) is obtained:

$$\phi Mn = \phi En - \phi In \text{ [rad]}$$

The phase difference obtained from the frequency component is calculated as time difference for each frequency by the following equation:

$$tn = \phi Mn/(2 \times \Pi)/fn \text{ [sec]}$$

Weighted averaging is performed on time difference for each of the frequencies thus obtained according to amplitude of each of the frequency components. The time difference may be acquired after performing the weighted averaging on the phase difference. The time difference obtained here corresponds to the precise time difference as given above. Based on the precise time difference, precise (fine) measured distance value (Dist (fine)) is calculated.

As "Mag n" in the equation given below, the amplitude "Mag En" obtained from the distance measurement signal pulse waveform or a product of amplitudes Mag In and Mag En as obtained from the internal reference signal pulse may be used.

$$\text{Dist (fine)} = (\Sigma(tn \times \text{Mag } n)/\Sigma(\text{Mag } n)) \times C/2 \text{ [m]}$$

where

C: light velocity [m/S]

By using coarse clock count "Cnt E" obtained from the distance measuring optical path 13 and coarse clock counter Cnt I obtained from the internal reference optical path 10, coarse measured distance value (Dist (coarse)) is calculated by the following equation:

$$\text{Dist (coarse)} = (\text{Cnt } E - \text{Cnt } I) \times (1/f\text{sample}) \times C/2 \text{ [m]}$$

Further, by combining the fine measured distance value and the coarse measured distance value according to the following equation, distance value is calculated:

$$\text{Dist} = \text{Dist (coarse)} + \text{Dist (fine)} \text{ [m]}$$

In a case where data position of the peak value of pulse waveform differs between the distance measurement signal pulse and the internal reference signal pulse, the phase obtained from the frequency of higher order may differ from phase information obtained from f2 by n cycles. Thus, the phase should be corrected. Or, in order that the data position will be the same, the digital comparator 19 should detect both rising edge and falling edge of the pulse waveform data and calculation should be made by storing the data of the ring buffer unit 18 in the storage unit 20.

Description will be given below on an example of the correction method as described above.

The time Dfn from peak value to peak value of the distance measurement signal pulse and the internal reference signal pulse is calculated from count values of the rising edge and the falling edge of each signal.

A product of each frequency and the time between the peak values as described above are obtained. Then, phase difference is normalized by 2Π, and the difference is obtained.

$$fn \times Dfn - \phi Mn/2\Pi$$

By rounding the result obtained from the above formula, "COR n" is acquired. After obtaining the number of cycles to be corrected, time difference is calculated by the following equation for each of the frequencies:

$$tn = (\phi Mn/2\Pi + \text{COR } n)/f \text{ [sec]}$$

Figure 8:
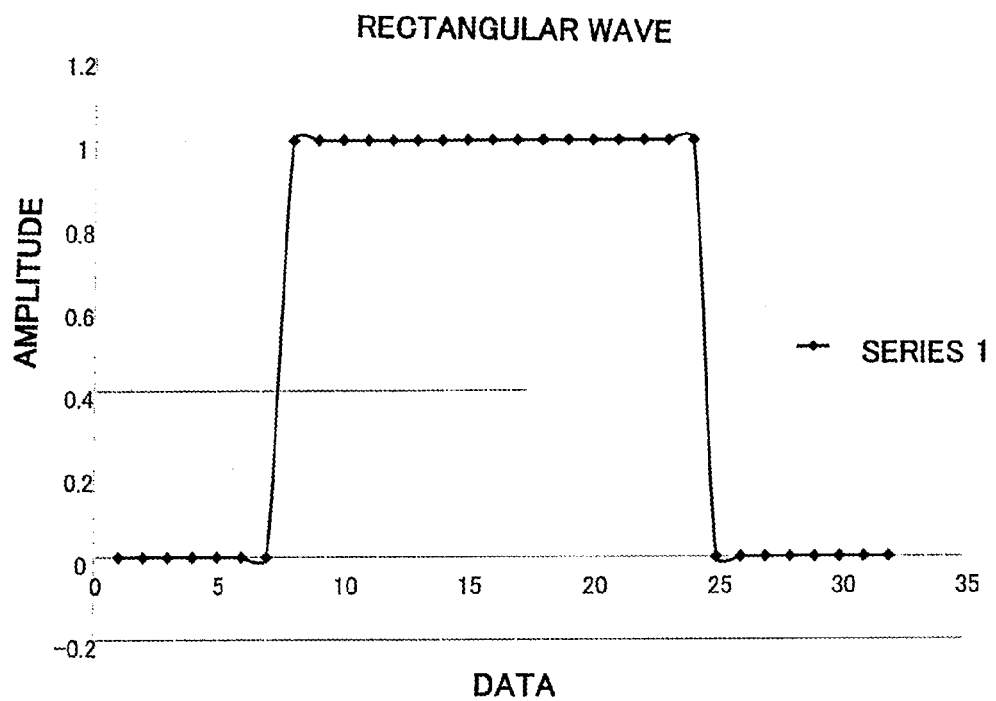
FIG. 8 is a graph to show a relation between the results of sampling obtained by A/D conversion when the waveforms detected by the photodetector are rectangular waves.
Figure 9:
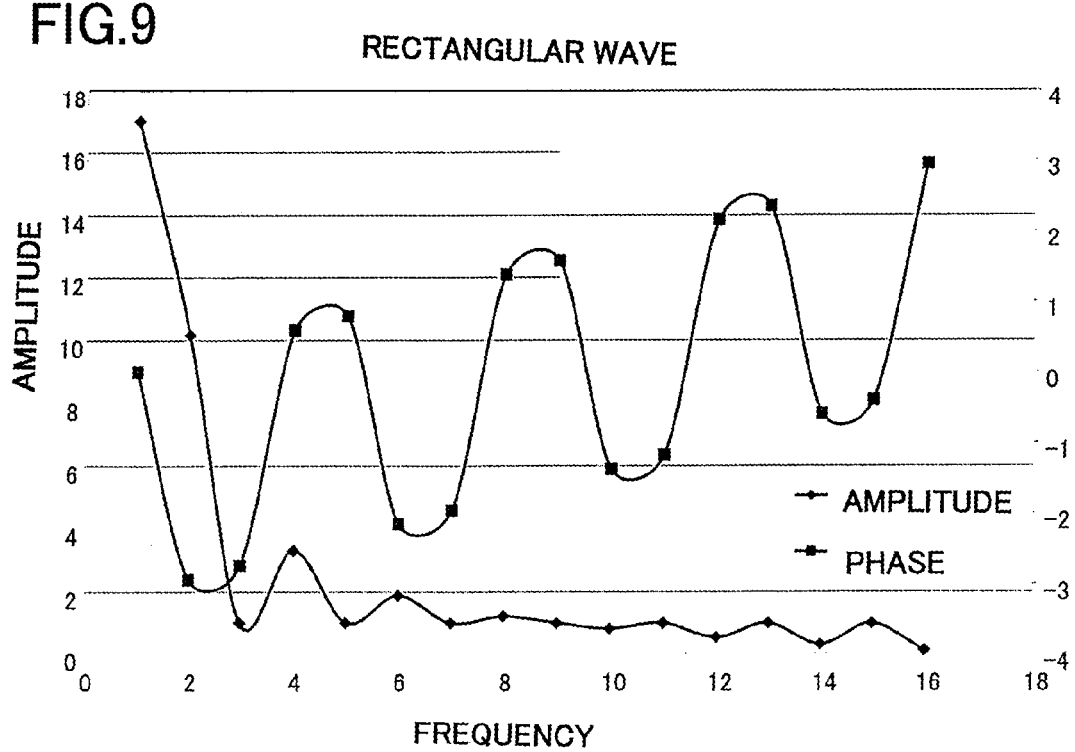
FIG. 9 is a graph to show the results of calculation of amplitude and phase when the rectangular waves shown in FIG. 8 are processed by Fourier transform.

FIG. 8 schematically shows simple waveforms in a case where the amplifier 15 is saturated. FIG. 9 shows the results of the Fourier function transform (FFT) of the waveforms shown in FIG. 8. Unlike a case in FIG. 7 where the Fourier function transform (FFT) is performed from the Gaussian waves, it is evident that information data on amplitude and phase are indicated up to higher frequency components.

By using the rough clock counter 25 of the rising edge and the falling edge, photodetection pulse width can be detected. By detecting the photodetection pulse width, it is possible to invalidate photodetection data where the pulse width is widened by multiple reflections.

Figure 10:
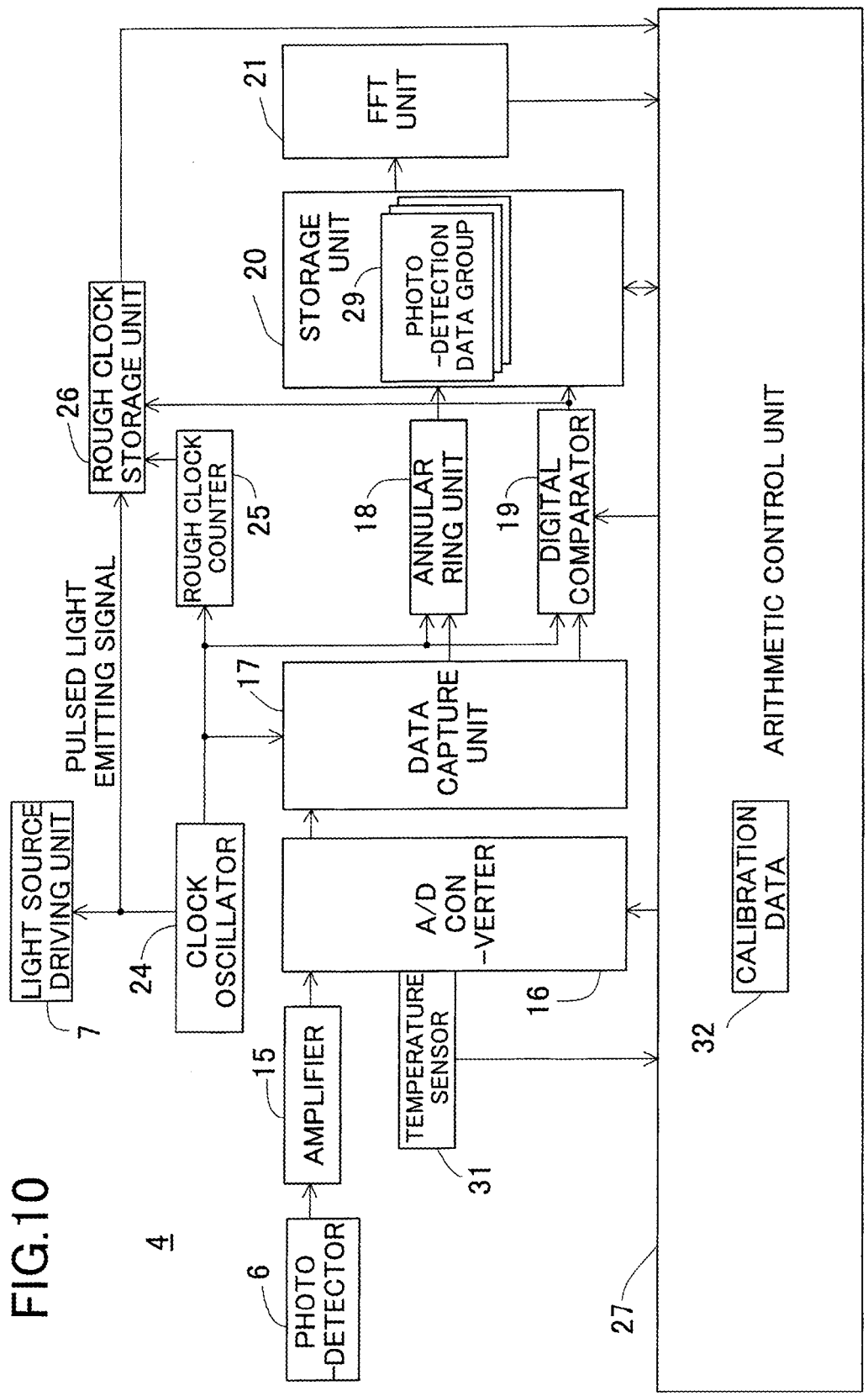
FIG. 10 is a schematical block diagram of a measuring unit in a second embodiment.

FIG. 10 shows a measuring unit 4 in a second embodiment. In FIG. 10, the same component as shown in FIG. 3 is referred by the same symbol, and detailed description is not given here.

The second embodiment shows how correction is made in case the characteristics are changed according to temperature in an A/D converter 16.

A temperature sensor 31 for detecting temperature of the A/D converter 16 is provided, and an arithmetic control unit 27 has calibration data 32 for correcting the characteristics of the A/D converter 16.

The A/D converter 16, which is operated at high speed, has a multiple of cores for the A/D conversion inside, and the A/D converter 16 is operated at high speed by carrying out the A/D conversion by using these multiple of cores. However, these cores are slightly different from each other in the characteristics. To utilize performance characteristics of the A/D converter 16 to the full extent, it is necessary to correct the properties of these multiple of cores.

To perform the correction, sine wave to be used as reference should be inputted in each core. Then, digital data to be outputted is processed by the Fourier transform. A correction data is calculated from data of amplitude, offset, phase, and correction value based on the result is inputted to the A/D converter 16, and the A/D converter 16 is calibrated. There may be the cases where the A/D converter 16 itself can automatically perform these processes of calibration. However, it is necessary to perform the calibration each time the temperature is changed because the characteristics of the cores are changed according to the temperature.

Based on the temperature obtained from the temperature sensor 31, the arithmetic control unit 27 monitors temperature of the A/D converter 16 and performs calibration as adequate.

If it is so arranged that the calibration data 32 of the A/D converter 16 within the temperature range in use are acquired in advance, and the calibration data 32 are stored in the arithmetic control unit 27, and that the A/D converter 16 is calibrated based on the calibration data 32, which correspond to the temperature obtained from the temperature sensor 31, it is possible to control the A/D converter 16 so as to have the most appropriate characteristics.

In the above, description has been given on calibration inside the A/D converter 16. However, when the A/D converter 16 operated at high speed is used, time delay outputted from each of the cores differs from each other in high-speed digital data as outputted from the A/D converter 16, and the extent of delay of digital signal may differ according to wiring length of a circuit board. Description will be given below on correction of delay of the communication to and from the A/D converter 16.

A data capture unit 17 sets up (synchronizes) the timing of data capture for each of data lines from the A/D converter 16, and high-speed digital signals are captured.

For the purpose of synchronizing, a test pattern is outputted from the A/D converter 16. As an example, a test pattern is set up so that all of data lines are set to Hi level once in 11 clocks. An arbitrary bit of the test pattern is selected, and arbitrary delay (several tens to several hundreds of picoseconds) is added to the signal of the bit thus selected.

After adding the delay, an internal counter is started at the time when the data is turned to Hi. Then, it is confirmed that the data are turned to Hi again when the internal counter comes to 11, and synchronization signal where the data are turned to Hi for each of 11 clocks is prepared inside of the data capture unit 17.

The synchronization signal prepared as described above is compared with data of other bit, and delay of the data is added so that the data are also turned to Hi when the synchronization signal is Hi and the extent of delay of all of the bits are set up respectively.

The extent of delay of the data is increased or decreased, and the extent of delay is acquired, which is changed from Hi to Low and from Low to Hi. By setting the delay at the center of the period of Hi, the extent of delay which is the most distant from jitter or skew and where stable data can be acquired can be calculated and set up.

By designing an amplifier 15 in logarithmical amplifier arrangement and by using non-linear region with respect to the inputted electric current, it is possible to extend dynamic range of photodetection light amount.

In a case where the frequency characteristics of trans-impedance amplifier exceed Nyquist frequency of the A/D converter 16, it is recommended that a low-pass filter is placed between the trans-impedance amplifier and the A/D converter 16.

Figure 11:
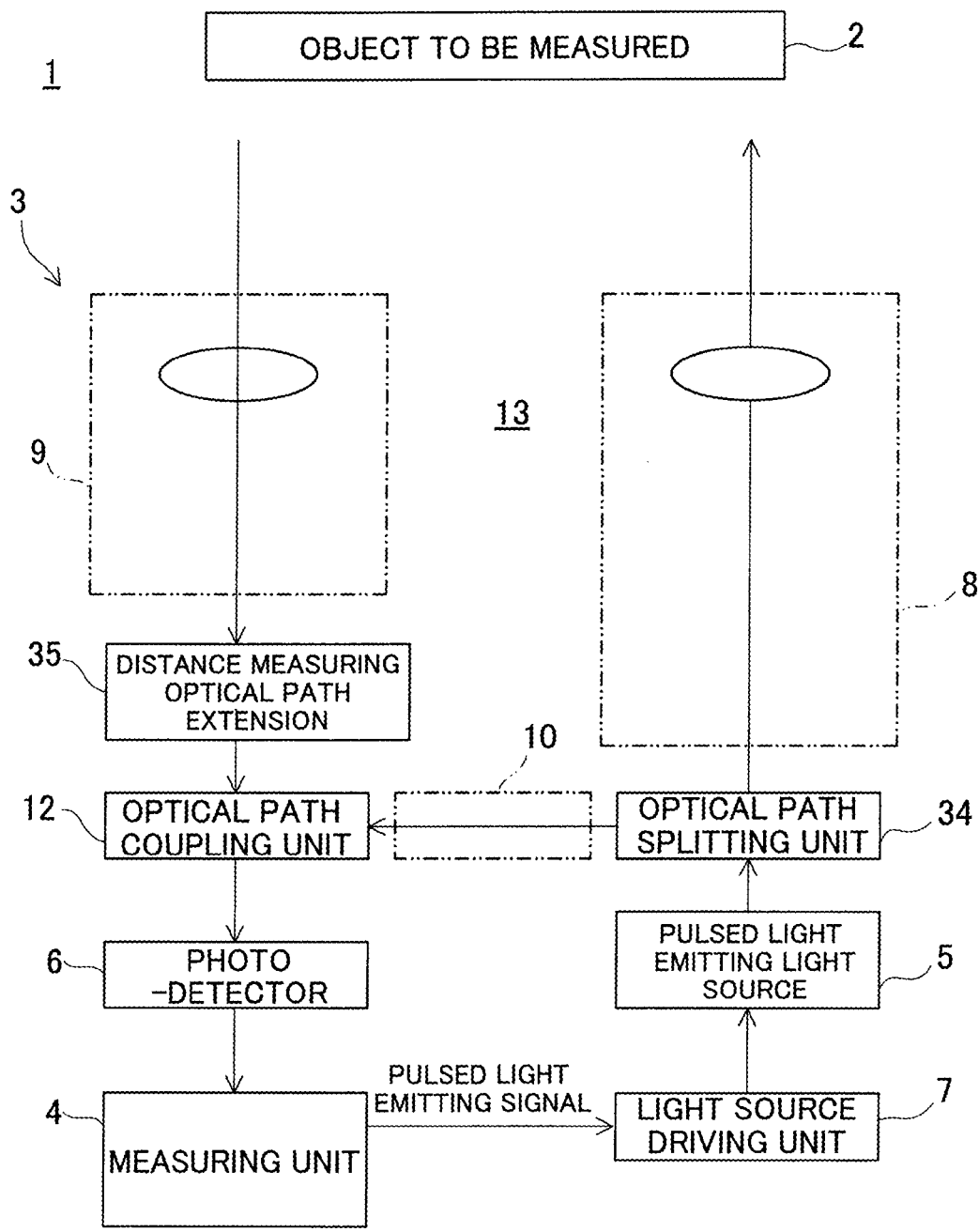
FIG. 11 is a schematical block diagram of an electronic distance measuring instrument according to a third embodiment.

FIG. 11 shows a third embodiment.

In the third embodiment, compared with the first embodiment, an optical path splitting unit 34 is provided in place of an optical path changeover unit 11. Further, a distance measuring optical path extension 35 is disposed along a distance measuring optical path 13.

Optical fiber or the like may be used as the distance measuring optical path extension 35. The optical path splitting unit 34 fulfills the function as pulsed light guiding means which directs a pulsed light emitted from a pulsed light emitting light source 5 along the distance measuring optical path 13 and directs the pulsed light along an internal reference optical path 10 as an internal reference pulsed light.

In the third embodiment, one pulsed light is split to a distance measuring pulsed light and to an internal reference pulsed light by the optical path splitting unit 34.

The distance measuring optical path extension 35 delays reaching time of a reflected pulsed light to a photodetector 6, and causes a difference between the reaching time of the internal reference pulsed light (which reaches the photodetector 6 via the internal reference optical path 10) and the reaching time of the reflected pulsed light (which are reflected by an object to be measured 2 and are detected via a photodetection optical system 9). It is so arranged that the distance can be measured from a single pulsed light without changing the optical path.

Figure 12:
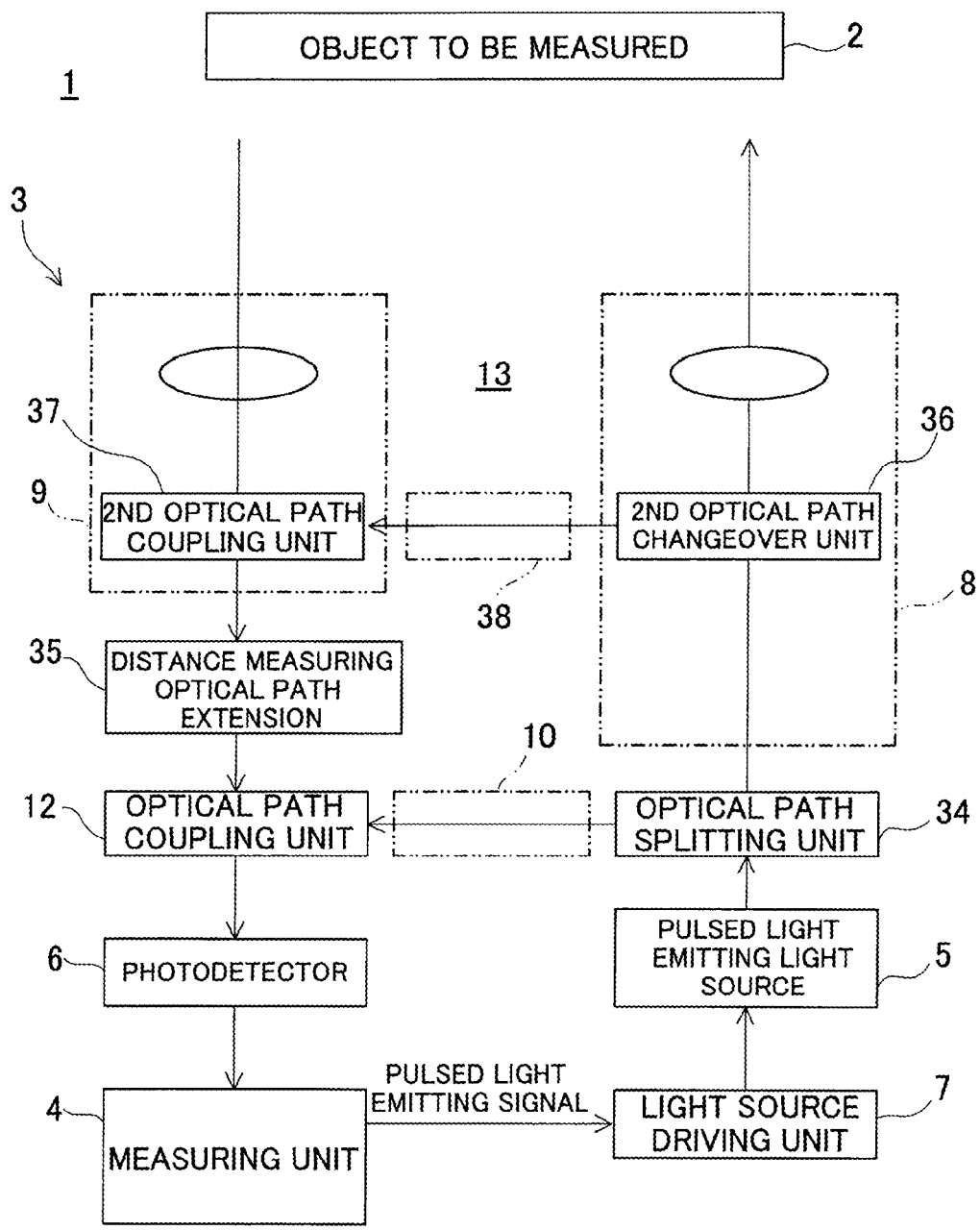
FIG. 12 is a schematical block diagram of an electronic distance measuring instrument according to a fourth embodiment.

FIG. 12 shows a fourth embodiment of the present invention. In the fourth embodiment, a second optical path changeover unit 36 is provided in a projection optical system 8, and a second optical path coupling unit 37 is provided on a photodetection optical system 9. Further, a second internal reference optical path 38 is disposed, which connects the second optical path changeover unit 36 with the second optical path coupling unit 37. By a control signal from an arithmetic control unit 27, the second optical path changeover unit 36 changes over the optical path to a distance measuring optical path 13 and the second internal reference optical path 38. In the fourth embodiment, it is so arranged that distance value can be calculated by obtaining a difference between distance value of the distance measuring optical path 13 and distance value of the second internal reference optical path 38.

Figure 13:
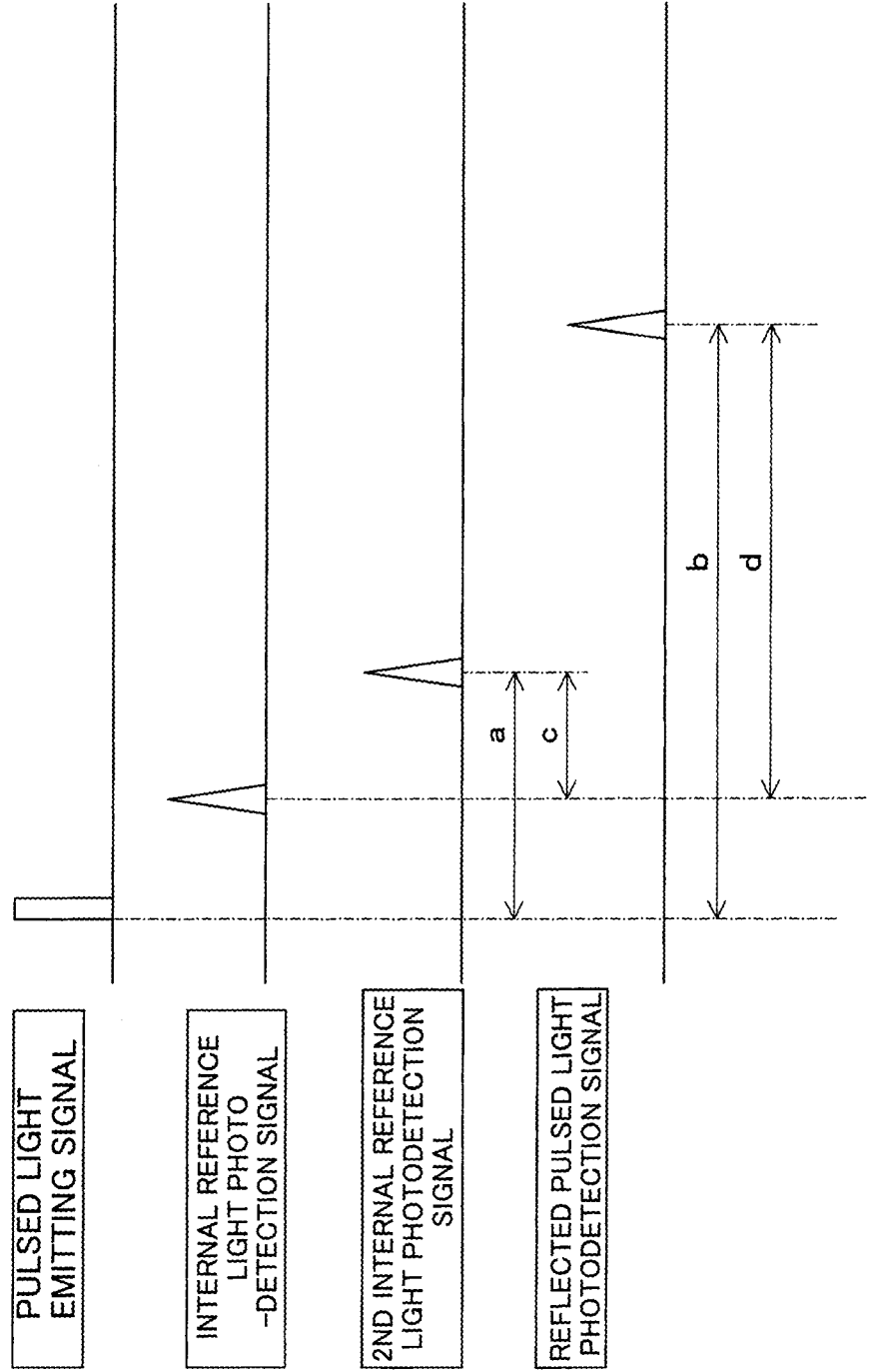
FIG. 13 is a graph to show a relation between a pulsed light emitting signal, an internal reference light photodetection signal, a second internal reference light photodetection signal, and a reflected pulsed light photodetection signal in the fourth embodiment.

FIG. 13 shows a relation between a pulsed light emitting signal and a photodetection signal in the fourth embodiment. An internal reference pulsed light passing through an internal reference optical path 10, a second internal reference pulsed light passing through the second internal reference optical path 38, and a reflected pulsed light passing through the distance measuring optical path 13 enter a photodetector 6, and a photodetection signal, which corresponds to the received pulsed light, is issued from the photodetector 6.

It is supposed here that the time up to the second internal reference light photodetection signal is referred as "a" as a reference of a pulsed light emitting, and the time up to the reflected pulsed light receiving signal is referred as "b" as a reference of the pulsed light emitting signal. Further, it is supposed that the time difference between the internal reference light photodetection signal and the second internal reference light photodetection signal is referred as "c", and that the time difference between the internal reference light photodetection signal and the reflected pulsed light photodetection signal is referred as "d". Then, the time, during which a distance measuring light goes to and comes back from an object to be measured 2 can be calculated as (d−c) and (b−a) respectively.

In the embodiment as given above, light emission of a pulsed light emitting light source 5 is synchronized with the pulsed light emitting signal, and the time up to the photodetection signal is obtained by using the pulsed light emitting signal as reference. However, it may be so arranged that the pulsed light emitting light source 5 is not synchronized with the pulsed light emitting signal from a clock oscillator 24, and the light may be emitted non-synchronously.

In a case where the light is emitted non-synchronously from the pulsed light emitting light source 5, it can be applied to an electronic distance measuring instrument 1, which is based on a mode to split the pulsed light by an optical path changeover unit 11, and a time up to the photodetection of the reflected pulse is measured by using the photodetection signal of the internal reference light as reference.

Figure 14:
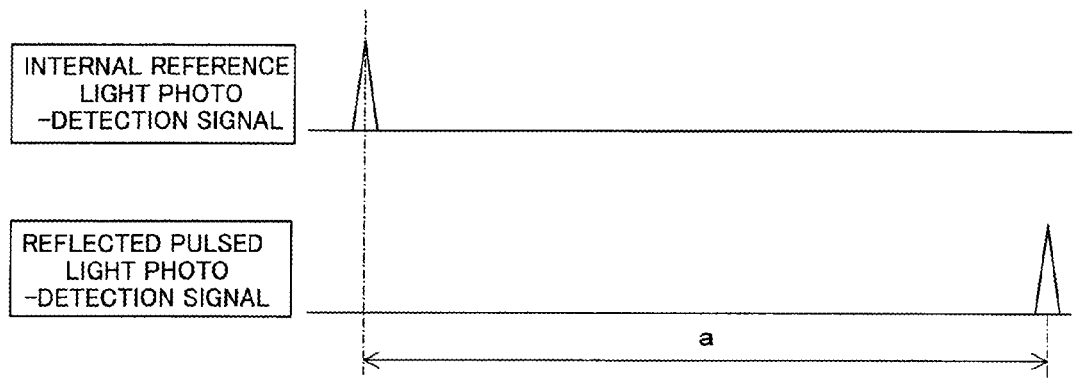
FIG. 14 is a graph to show an optical arrangement similar to an optical arrangement of the third embodiment and represents a relation between the internal reference light photodetection signal and a reflected pulsed light photodetection signal when the pulsed light is emitted in non-synchronized manner.

FIG. 14 shows a relation between the internal reference light photodetection signal and the reflected pulsed light photodetection signal in a case where FIG. 14 has a same optical configuration as the third embodiment and the pulsed light emitting light source 5 emits non-synchronously, and photodetection time difference "a" between the internal reference light photodetection signal and the reflected pulsed light photodetection signal is used for calculation of the distance.

Figure 15:
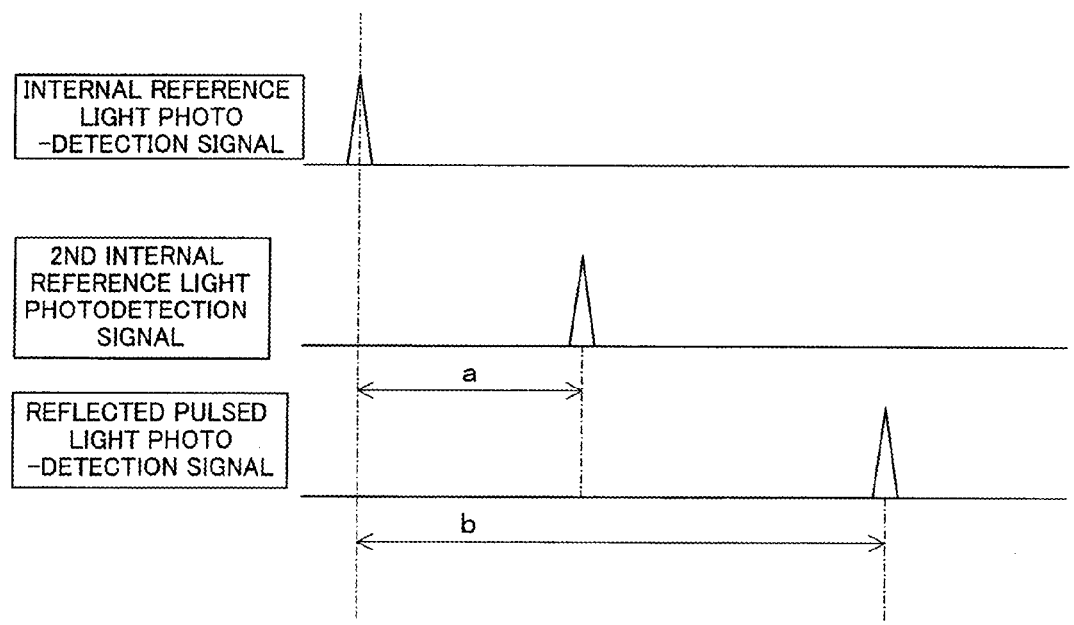
FIG. 15 is a graph to show an optical arrangement similar to an optical arrangement of the fourth embodiment and represents a relation of the internal reference light photodetection signal with a second internal reference light photodetection signal and with a reflected pulsed light photodetection signal when the pulsed light is emitted in non-synchronized manner.

FIG. 15 shows relations between the internal reference light photodetection signal and the second internal reference light photodetection signal and between the internal reference light photodetection signal and the reflected pulsed light photodetection signal in a case where the pulsed light emitting light source 5 is emitted non-synchronously. Optical arrangement corresponds to arrangement of the fourth embodiment shown in FIG. 12. Using the internal reference light photodetection signal as reference, the time "a" up to the second internal reference light photodetection signal and the time "b" up to the reflected pulsed light photodetection signal are obtained respectively, and the time, during which the distance measuring light goes to and comes back from the object to be measured 2 can be calculated as: (b−a).

As examples of the non-synchronous pulsed light emitting light source, there are pulsed laser light sources based on self-oscillation such as Q-SW laser, fiber laser, etc. Further, as examples of the synchronized pulsed light source, pulsed laser light sources such as PLD, fiber amplifier laser, etc. are known, which can control timing of light emission by electric signals.

The invention claimed is:

1. An electronic distance measuring method, comprising a step of performing coarse distance measurement based on difference of photodetection time between an internal reference pulsed light and a distance measuring pulsed light reflected from an object to be measured, a step of carrying out Fourier function transform on photodetection waveform of the internal reference pulsed light and photodetection waveform of the distance measuring pulsed light respectively, a step of separating the waveforms to a plurality of frequency components, a step of obtaining phase difference for each of the frequency components acquired, a step of performing fine distance measurement based on difference of time acquired from phase difference, and a step of measuring a distance to said object to be measured by adding a result of coarse distance measurement to a result of fine distance measurement.

2. An electronic distance measuring instrument, comprising a distance measuring optical path, an internal reference optical path, a pulsed light emitting light source for emitting a pulsed light, a pulsed light guiding means for directing the pulsed light emitted from said pulsed light source toward said distance measuring optical path as a distance measuring pulsed light and for directing the pulsed light toward said internal reference optical path as an internal reference pulsed light, a photodetector for emitting photodetection signal by detecting the distance measuring pulsed light and the internal reference pulsed light, and a measuring unit for calculating a distance to an object to be measured based on a photodetection signal from said photodetector, wherein said measuring unit performs coarse distance measurement based on difference of photodetection time between the internal reference pulsed light and the distance measuring pulsed light reflected from said object to be measured, carries out Fourier function transform on photodetection waveform of the internal reference pulsed light outputted by said photodetector and photodetection waveform of the distance measuring pulsed light respectively, separates the waveforms to a plurality of frequency components, obtains phase difference for each of the frequency components acquired, performs fine distance measurement based on time difference acquired from phase difference, and measures a distance to said object to be measured by adding a result of coarse distance measurement to a result of fine distance measurement.

3. An electronic distance measuring instrument according to claim 2, wherein said measuring unit comprises an A/D converter for converting a photodetection signal acquired from said photodetector by analog-digital conversion, a data capture unit for receiving digital signal from said A/D converter, a buffer unit for successively storing data from said data capture unit, a digital comparator for detecting that the data from the data capture unit has crossed over a preset threshold value, a storage unit for storing data of the buffer unit based on a signal from the digital comparator, a Fourier function transform unit for processing the data of the storage unit by Fourier transform, a rough clock counter for counting sampling clocks of said A/D converter, a clock synchronized to the sampling clock, a rough clock storage unit for storing count value of said rough clock counter based on a signal from said digital comparator, a clock oscillator for supplying synchronized clock to each of said A/D converter, said data capture unit, said buffer unit, said digital comparator, and said rough clock counter, and an arithmetic control unit for calculating distance based on all data from said rough clock storage unit and from said Fourier function transform unit.

4. An electronic distance measuring instrument according to claim 3, wherein amplitude and phase of each of frequency components separated are obtained according to all data from said Fourier transform function unit, and weighted averaging is performed based on said amplitude and the distance is calculated.

5. An electronic distance measuring instrument according to claim 3, wherein there is provided a temperature sensor for detecting temperature of said A/D converter, and calibration of said A/D converter is performed according to detection signal from said temperature sensor.

6. An electronic distance measuring instrument according to claim 5, wherein said arithmetic control unit has calibration data corresponding to temperature of said A/D converter, selects said calibration data based on temperature detecting signal from said temperature sensor, and performs calibration on said A/D converter.

7. An electronic distance measuring instrument according to claim 3, wherein there is provided a trans-impedance amplifier for converting an electric signal from said photodetector to a voltage signal, and output of said trans-impedance amplifier is a logarithmical output.

8. An electronic distance measuring instrument according to claim 3, wherein said pulsed light emitting light source is a synchronized pulsed light emitting light source for emitting a pulsed distance measuring light according to light emitting signal synchronized with a signal from said clock oscillator.

9. An electronic distance measuring instrument according to claim 3, wherein said pulsed light emitting light source is a non-synchronized pulsed light emitting light source for emitting a distance measuring pulsed light non-synchronized with a signal from said clock oscillator.

10. An electronic distance measuring instrument according to one of claim 2, 3 or 8, wherein there are provided said internal reference optical path for guiding the pulsed light from said pulsed light emitting light source toward said photodetector, an optical path coupling unit for coupling said internal reference optical path with optical path of a photo-detection optical system, said distance measuring optical path for projecting the pulsed light to said object to be measured, and an optical path changeover unit for changing over said internal reference optical path, wherein a distance is calculated from a pulsed light emitting signal, from the pulses detected by the distance measuring optical path, and from data acquired from the pulses as detected by said internal reference optical path.

11. An electronic distance measuring instrument according to claim 2, wherein said pulsed light guiding means is an optical path splitting unit for splitting the pulsed light from said pulsed light emitting light source, and wherein there are provided a distance measuring optical path extension for forming an optical path difference between the light reflected from said object to be measured and said internal reference optical path, and an optical path coupling unit for coupling said internal reference optical path with an optical path from said distance measuring optical path extension, wherein a distance is calculated from the pulsed light emission signal, from the reflected pulsed light detected by said distance measuring optical path and from the data acquired from the internal reference pulsed light as detected by said internal reference optical path.

12. An electronic distance measuring instrument according to claim 2, wherein said pulsed light guiding means is an optical path splitting unit for splitting the pulsed light from said pulsed light emitting light source and for guiding the pulsed light toward said internal reference optical path, and wherein there are provided a distance measuring optical path extension for forming an optical path difference between the reflected pulsed light reflected from said object to be measured and said internal reference optical path, and an optical path coupling unit for coupling said internal reference optical path with an optical path from said distance measuring optical path extension, wherein a distance is calculated from the internal reference pulsed light detected by said internal reference optical path and from the data acquired from reflected pulsed light detected by said distance measuring optical path.

13. An electronic distance measuring instrument according to claim 2, wherein said pulsed light guiding means is an optical path splitting unit for splitting the pulsed light from said pulsed light emitting light source, said optical path splitting unit guides the split pulsed light toward said internal reference optical path and wherein there are provided a distance measuring optical path extension, which is disposed along said distance measuring optical path, for forming an optical path difference from said internal reference optical path, an optical path coupling unit for coupling said internal reference optical path with an optical path from said distance measuring optical path extension, a second internal reference optical path for guiding the pulsed light from said pulsed light emitting light source to said distance measuring optical path extension, a second optical path coupling unit for coupling the light reflected from said object to be measured with said second internal reference optical path, a second optical path changeover unit for changing over said distance measuring optical path for projecting the pulsed light toward said object to be measured and said second internal reference optical path, wherein a distance is calculated from the pulsed light emitting signal, from the pulses detected by said distance measuring optical path, from the pulses detected by said internal reference optical path, and from the data acquired from said second internal reference optical path.

14. An electronic distance measuring instrument according to claim 2, wherein said pulsed light guiding means is an optical path splitting unit for splitting the pulsed light from said pulsed light emitting light source, said optical path splitting unit guides the split pulsed light toward said internal reference optical path and wherein there are provided a distance measuring optical path extension, which is provided along said distance measuring optical path, for forming optical path difference from said internal reference optical path, an optical path coupling unit for coupling said internal reference optical path with an optical path from said distance measuring optical path extension, a second internal reference optical path for guiding the pulsed light from said pulsed light emitting light source toward said distance measuring optical path extension, a second optical path coupling unit for coupling said second internal reference optical path with a light reflected from said object to be measured, and a second optical path changeover unit for changing over said second internal reference optical path, and wherein a distance is calculated from the pulses detected from said distance measuring optical path, from the pulses detected by said internal reference optical path, and from data acquired by said second internal reference optical path.

* * * * *